…

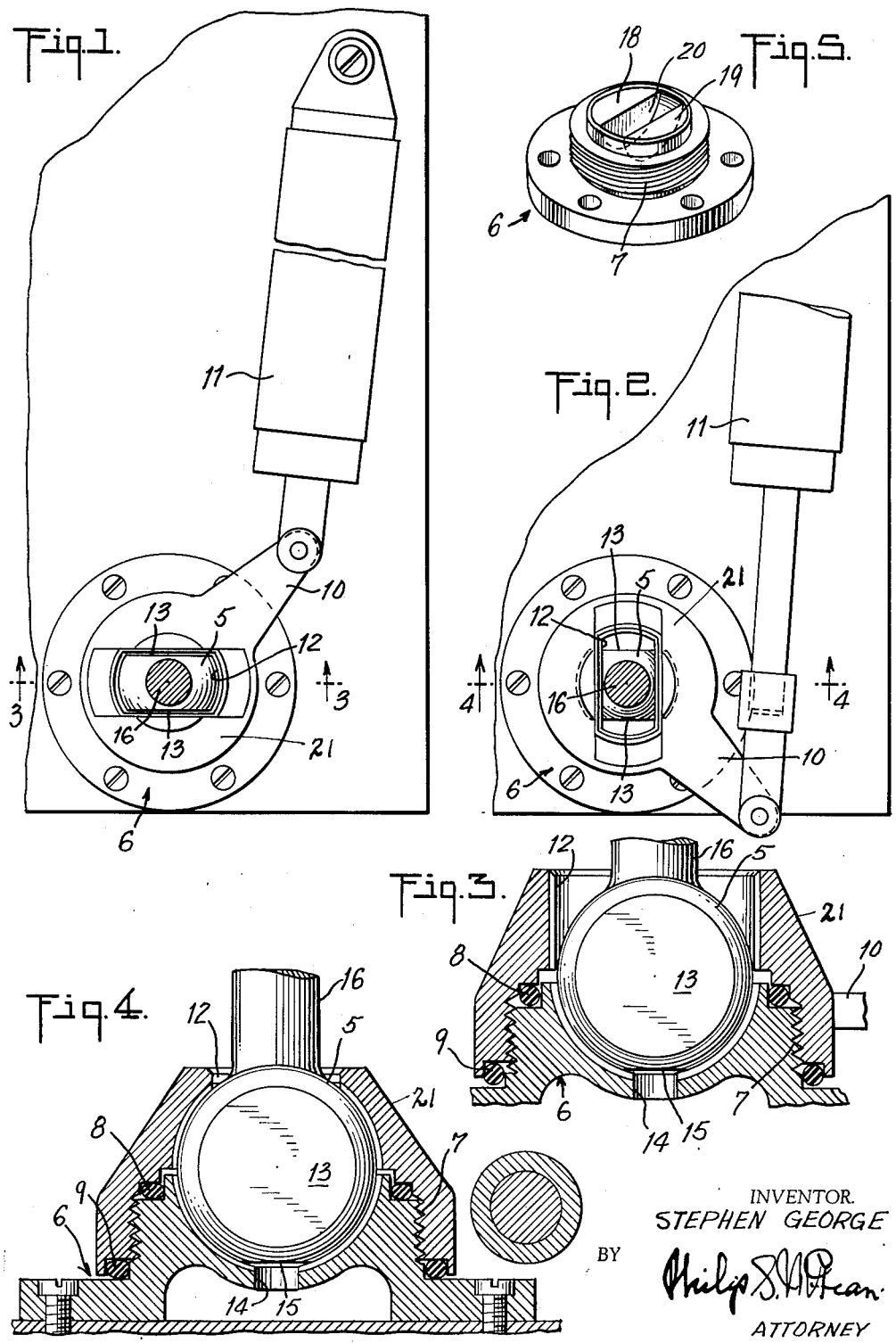

United States Patent Office 3,146,008
Patented Aug. 25, 1964

3,146,008
SELF-ALIGNING BALL JOINT CONNECTION
Stephen George, Pompton Lakes, N.J., assignor to M-T Liquidation Corporation, a corporation of New Jersey
Filed July 11, 1962, Ser. No. 209,110
3 Claims. (Cl. 287—87)

The invention herein disclosed relates to couplings for connecting different parts together and the objects of the invention are primarily to provide a quickly connectible and disconnectible form of coupling which will be automatically self-centering in all planes and which, with these and other advantages, will be of relatively simple and inexpensive construction.

In the accomplishment of these results the invention resides in a ball and socket form of construction in which the socket for the ball element is closed by a cap member, which is cross slotted the full diameter of the socket and the ball member has flattened sides enabling it to be entered in the socket through the cross slot, after which the cap may be partially rotated to lock the ball in the socket.

Other novel features of the invention and further desirable objects attained are set forth and will appear in the course of the following specification.

The drawing accompanying and forming part of the specification is illustrative of a practical commercial embodiment of the invention but it will be appreciated that structure may be modified and changed as regards the immediate illustration, all within the true intent and scope of the invention as hereinafter defined and claimed.

FIG. 1 in the drawing is a broken plan view, partly in section, of one of the self-aligning couplings, showing the parts positioned for entry of the ball element in the ball socket.

FIG. 2 is a generally similar view showing the cap of the socket rotated to lock the ball element within the socket.

FIG. 3 is an enlarged cross sectional view on substantially the plane of line 3—3 of FIG. 1.

FIG. 4 is a similar view taken on substantially the plane of line 4—4 of FIG. 2.

FIG. 5 is a perspective view showing the base portion of the ball socket modified to hold the ball element against rotation therein.

The companion elements of the coupling are in the form of a ball shaped pin or head 5 attachable to one of the elements to be coupled and a spherical socket for the same in the form of base or body 6, attachable to the other element to be connected and having an internally spherical cap 21, rotatably connected with the base by a screw joint 7.

O rings or equivalent, packing and holding elements may be installed between opposing shoulders on the base and cap as shown at 8, 9 and the cap may have an angularly extended arm 10 by which it may be turned by a hydraulic, pneumatic, or other such motor 11.

The cap is internally finished to complete the spherical conformation of the socket but at the top is cross slotted at 12 the full internal diameter of the cap, thus to provide a parallel sided entry into the spherical cavity.

The ball element, constituted to accurately fit the walls of the spherical socket is, in complementary form, flattened on opposite sides at 13 to closely fit the cross slot and thus to fully enter in the spherical socket.

Thus, when the ball element, with its flattened sides, is lined up with the cross slot in the cap, it may be entered into fully seated relation in the socket. Then with a slight rotation of the cap the ball will be locked and firmly secured in the socket.

To contrary effect the ball may be immediately released from the socket by rotating the cap back to a position of alignment of the slot with the flat sides of the ball, this as indicated in FIG. 1.

The cap may separate from the base on a diameter of the spherical socket so that the cross slot need only be cut in the cap and the spherical bottom portion of the socket be an unbroken spherical surface in the base.

FIG. 5 shows how the lower base portion of the socket may contain an anti-rotation feature for holding the ball element against rotation. This feature consists in the illustration of spherical segments 18, 19 secured in the ball socket in spaced relation providing a cross slot 20 proportioned to receive the flat side of the ball element. This anti-rotation device may be made up in various ways, serving in each instance to hold the inserted ball element against rotation and thus eliminating need for any external means to hold the ball against turning in the socket.

The ball and the base may be constructed in different ways for connection with different objects which are to be coupled together.

The screw mounting of the cap on the base allows for any necessary adjustment and may be used, if need be, to clamp the ball in tightly held engagement in the base.

The device consists of a minimum of simple, sturdy parts, which can be produced at low cost.

The invention is of particular service where parts are to be quickly coupled in accurately aligned relation and which, while positively and firmly held, are to be quickly releasable, by manual means such as a lever or handle or by motor power.

The motor for opening and closing the ball confining cap may be of any selected form, such as electrical, pneumatic or hydraulic, and may be mounted in any suitable fashion on the part to which the base of the socket is secured.

It is to be noted that this universal form of coupling is applicable generally to any such members which are intended to be readily connected and disconnected.

For practical reasons the bottom of the spherical cavity in the base member may have a drainage or clearance opening 14 and the ball may have a flattened lower end 15.

The ball element will usually have a stem or the like, such as shown at 16, for connection with one member to be coupled, this stem to extend through an opening provided for it in the top of the cap.

What is claimed is:
1. A quick connectible and disconnectible, self-aligning ball and socket coupling, comprising the combination of companion ball and socket elements,
   the socket element comprising a base having the lower half of a spherical socket therein and a cap having the matched upper half of the same spherical socket,
   said cap having a removable rotatably adjustable screw connection on said base and having a slot across the top of the same of the full diameter of the socket and extending entirely through the spherical socket portion of the cap, and said ball element having a spherical body portion matching the spherical portions of the connected base and cap and having flattened sides reducing said spherical portion to the size of said cross slot in the cap, whereby said ball element may be entered in and be removed from the spherical socket with the flattened sides of the same aligned with the cross slot in the cap and the ball element or cap be turned to effect relative registration or nonregistration of the ball element and cap as described, and
   said base having means for attachment of same to one member to be coupled and said ball element having a stem projecting up through said cross slot in the cap for connection with the other member to be coupled.

2. The invention according to claim 1 with semispherical segments fitting in the spherical socket portion of the base at opposite sides of the flattened sides of said ball element.

3. The invention according to claim 1 with semispherical segments secured in nonrotatable relation in the spherical socket portion of the base at opposite sides of the flattened side portions of said ball element for retaining said ball element against rotation about the axis of said projecting stem.

References Cited in the file of this patent

UNITED STATES PATENTS

| | | |
|---|---|---|
| 849,384 | Gault | Apr. 9, 1907 |
| 1,065,483 | Turner | June 24, 1913 |
| 1,590,465 | Klinkosh | June 29, 1926 |
| 1,811,736 | Van Bezel | June 23, 1931 |
| 2,509,272 | Karnuth et al. | May 30, 1950 |

FOREIGN PATENTS

| | | |
|---|---|---|
| 192,639 | Switzerland | Nov. 1, 1937 |